July 31, 1956    G. S. BRIGGS ET AL    2,757,103
METHOD OF MAKING PHOSPHOR SCREENS
Filed Oct. 22, 1953
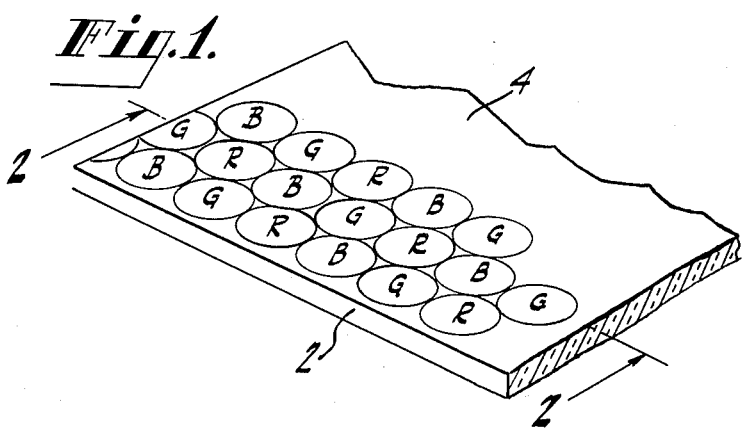
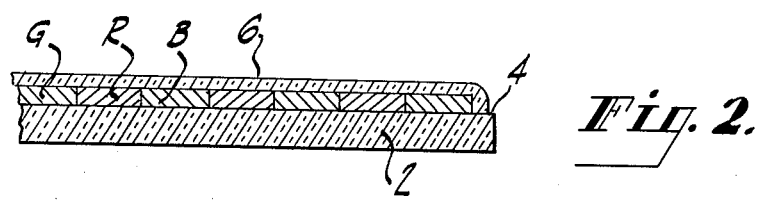
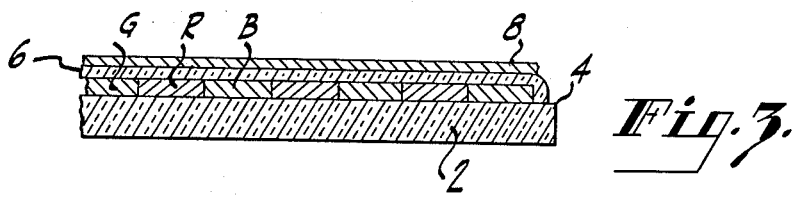
INVENTORS
GEORGE S. BRIGGS &
DANIEL J. DONAHUE
BY W.S. Hill
AGENT United States Patent Office 2,757,103
Patented July 31, 1956

2,757,103

METHOD OF MAKING PHOSPHOR SCREENS

George S. Briggs and Daniel J. Donahue, Lancaster, Pa., assignors to Radio Corporation of America, a corporation of Delaware Application October 22, 1953, Serial No. 387,746

7 Claims. (Cl. 117—33.5)

This invention relates to an improved method of making luminescent viewing screens and, more particularly, to an improved method of making screens including phosphors which are relatively unstable at high temperatures.

Various methods have heretofore been proposed for making luminescent viewing screens comprising phosphors which are excited by cathode rays. In making black-and-white television viewing screens, for example, one conventional method comprises partially filling the envelope of a cathode ray tube with an aqueous suspension of a phosphor composition containing a small proportion of an inorganic binder, permitting the phosphor to settle out of the suspension forming a film on the inner surface of the face plate of the tube, drying the phosphor film, and finally baking to harden it and to drive off all volatile constituents. This type of method cannot be used alone, however, in making a tricolor television kinescope viewing screen where the screen comprises a multiplicity of microscopically sized phosphor elements such as dots or lines. The phosphor elements must be very accurately spaced, should be of substantially uniform size and, of course, should be made up of as many different phosphors as there will be primary colors in the television image.

Previously, in the manufacture of luminescent screens, where organic binders have been used, they have been of two different types. One of these types can be burned off in an oxygen-containing atmosphere, the times and temperatures employed normally being about 60–120 minutes at 400–460° C., although some of the members in this class can be burned off at somewhat lower temperatures. Examples of this type of binder are cellulose esters such as nitrocellulose.

The other type of binder referred to above is the type which is depolymerizable at elevated temperatures. This type may be driven off by depolymerizing the substance, in the absence of oxygen or presence of oxygen at various pressures, and the temperatures employed are considerably lower than where burning off must be used. For example, temperatures of the order of 350° C. can be used. Examples of this type of binder are polystyrene, polyisobutylene and the alkyl alkacrylates.

In making tri-color television kinescopes, it is desirable to use zinc selenide or zinc cadmium selenide activated with copper, as the red-emitting phosphor. This phosphor is very unstable at elevated temperatures. It becomes unstable and loses luminescence efficiency rapidly when heated to temperatures above 350° to 400° C. for any appreciable time, although the reasons for the loss in efficiency are not precisely known. In the past it has been thought, however, that the instability was mainly due to the phosphor being decomposed when heated to elevated temperatures in air or oxygen. Consequently, when applying this phosphor to television screens, the efforts to utilize this phosphor have previously been along the line of baking the screen in the absence of air.

Although screens for color television kinescopes may be of any one of a large number of different types, the type which has at present proved to be most practical comprises a multiplicity of discrete phosphor elements, such as dots or lines, laid down on one surface of a glass plate, which plate becomes the viewing screen of the kinescope. In one type of process for preparing luminescent screens comprising discrete phosphor elements, the phosphors are mixed with an organic binder and with sufficient organic solvent to make a paste. Since the discrete elements are microscopic in width, whether these elements be dots or lines, the organic binder must be one which meets certain rigid specifications.

One of the most successful techniques for laying down screens comprising a multiplicity of dots or lines is the so-called silk screen method. The technique of silk screening to produce a tri-color phosphor screen is described in U. S. Patent 2,625,734 of H. B. Law issued January 20, 1953. The Law patent describes a method of positioning the dots accurately and of applying the phosphors through the master pattern of the screen.

When the zinc selenide or zinc cadmium selenide phosphors are made up into paste form and laid down in the form of discrete elements which are then baked in the usual way, a number of problems have been encountered. If nitrocellulose or another cellulose ester is used as the binder, it is not possible to make satisfactory viewing screens. At temperatures of 400 or 450° C., the usual bake-out temperatures for phosphor screens, if short baking periods are used, the cellulose ester does not completely burn off but leaves more or less char behind on the face plate. If the temperature is raised high enough, or if the baking time at 400–450° C. is increased sufficiently to burn off all of the char, the selenide phosphor then loses substantially all luminescence. Past attempts to utilize organic binders other than nitrocellulose which can be burned off at elevated temperatures have also proved unsuccessful with selenide phosphors even though the charring problem is not always present because at the bake-out times and temperatures conventionally employed, the phosphor proved to be unstable to the extent that luminescence efficiency decreased greatly during tube processing.

To eliminate the difficulty of residual charring, other types of organic binders have been resorted to. When the previously mentioned depolymerizable type is used, however, it has been found that these binders do not have desirable screening properties since they spin long threads when suspended in air. Thus the methyl or ethyl methacrylate polymers, which are satisfactory so far as being able to be volatilized at relatively low temperatures, are not suitable because of their undesirable screening characteristics.

One object of the present invention is to provide an improved method of making phosphor viewing screens including phosphors which are unstable at elevated temperatures.

Another object of the present invention is to provide an improved method of making tri-color phosphor television kinescope viewing screens.

Another object of the invention is to provide an improved method of processing luminescent viewing screens including selenide phosphors.

A further object of the invention is to provide an improved method of making viewing screens from phosphors having relatively low decomposition temperatures without substantially decreasing luminescence efficiency of the phosphors.

An important feature of the present invention comprises an improved method of manufacturing a luminescent viewing screen where the luminescent material comprises a phosphor which is relatively unstable at temperatures above about 350° C. to 400° C. The screen is applied by a method including the steps of baking a layer of the phosphor containing an organic binder under forced air circulation at a temperature above about 350° C. for about 8 to 30 minutes and a maximum temperature of about 375–400° C. is maintained for only about 1 to 5 minutes. If the screen is to be aluminized, it is then covered with a thin layer of potassium silicate or sodium silicate.

The invention will be more fully described in the following detail description and the accompanying drawing of which:

Fig. 1 is a perspective view, greatly enlarged, of a portion of a typical viewing screen in accordance with one embodiment of the present invention.

Fig. 2 is an enlarged cross-section elevation view taken along the line 2—2 of Fig. 1 but with an added feature in accordance with another embodiment of the invention, in an intermediate state of manufacture, and Fig. 3 is a view similar to that of Fig. 2 for the screen in a final stage of manufacture.

Similar elements are designated by similar reference numerals throughout the drawing.

Referring now to the drawing, the improved method of the present invention will be illustrated with a tri-color viewing screen comprising a red-emitting phosphor, a green-emitting phosphor and a blue-emitting phosphor. The particular color of emission of each phosphor is, however, immaterial as far as the present invention is concerned.

The blue-emitting phosphor may be, for example, zinc sulfide activated with silver. The silver activator content may be, for example, .005 to .025% by weight. The green-emitting phosphor may be, for example, zinc silicate activated with from about .1 to about 3% by weight of manganese. Each of the blue-emitting and green-emitting phosphors may be made up into a paste suitable for silk-screening by mixing a quantity of the phosphor with 10% N–300 ethyl cellulose in iso-amyl alcohol, sufficient solvent being used to provide a viscosity of about 40,000 to about 50,000 cps. The proportion of phosphor to ethyl cellulose may be about 1.1 parts by weight phosphor to 1 part ethyl cellulose.

The red-emitting phosphor used for making tri-color kinescope screens is preferably zinc selenide or zinc cadmium selenide in which the ratio of zinc to cadmium is at least 8:1 and which contains about .003 to .03% by weight copper activator. This phosphor has been found to provide the best red color and highest luminescence efficiency of all the red-emitting phosphors. It has the disadvantages, however, of being unstable at elevated temperatures. It has therefore proven very difficult in the past to successfully apply this phosphor to screens of television kinescopes. When it is baked in air at ordinary bake-out temperatures, it rapidly loses luminescence efficiency. In fact, unless great care is used, it becomes completely dead to cathode rays excitation if treated in the manner usually heretofore used for baking out cathode ray tubes.

In accordance with the present invention, however, it has been found that zinc selenide phosphor can be successfully applied to luminescent screens with little or no loss in luminescence efficiency and screen brightness and, in addition, screens made using the improved technique, have maintained their initial brightness characteristics extremely well under long continued cathode ray bombardment compared to screens made of red-emitting phosphors, such as zinc phosphate, formerly employed in making cathode ray tube screens.

As in the case of the blue-emitting and the green-emitting phosphor, a screen paste is made up of the red-emitting phosphor. This may comprise about 1.2 parts by weight phosphor to 1.0 part of 10% N–300 ethyl cellulose in iso-amyl alcohol although the production of phosphor to ethyl cellulose has been varied between about 1.1–1.5 parts phosphor to 1 part ethyl cellulose.

Referring to Fig. 1, utilizing the screen paste made as described above, dots "R" of the red-emitting phosphor, dots "B" of the blue-emitting phosphor, and dots "G" of the green-emitting phosphor are deposited on one surface 4 of a supporting element constituted by the screen face plate 2, with conventional silk-screening technique. The phosphors are placed on the face plate one at a time. Thus, all of the red-emitting dots are placed on in one operation. The silk screen is removed and the dots are dried so that they will not smear. All of the blue-emitting phosphor dots are laid down and the same drying process is repeated. Finally, the green-emitting phosphor dots are deposited. In this manner the entire face plate is covered with phosphor dots which are either very closely spaced or actually contiguous with each other.

The screen is next subjected to a carefully controlled baking operation. The face plate is placed in an oven with forced air circulation and the temperature of the screen is gradually raised to a maximum of about 375° C. It is held at this temperature for only one minute and then the screen is gradually cooled to room temperature. The rate of heating and cooling is adjusted so that the temperature is at a level of over 350° C. for about 8 to 12 minutes. It is possible to vary this firing schedule somewhat and still obtain satisfactory although not optimum results. The maximum temperature may be held from about 1 to 5 minutes and the temperature may remain above the 350° level from about 8 to 30 minutes. Also, it is possible to raise the maximum temperature to about 400° C. When the temperature is raised substantially higher than 400° C., however, the selenide phosphor begins to decompose.

When using the particular firing schedule specified above, it is also necessary to use the aforementioned forced air circulation since the ethyl cellulose may not burn off completely at the times and temperatures specified if air circulation is not adequate. The minimum volume of air circulated per minute will of course vary with the size and construction of the oven. It should be adjusted such that burn-off of the organic binder is complete within the bake-out time selected as described above.

A screen, made as above described, may be utilized without further treatment as a viewing screen of a color television kinescope. However, if the screen is to be aluminized for increased brilliance, further processing steps are required. Referring to Fig. 2, a thin layer 6 of either potassium silicate or sodium silicate is sprayed over the surface of the phosphor dots in order to hold them in position and prevent them from floating loose from the screen if the screen is later aluminized by a process which includes covering the phosphor initially with a layer of water. This silicate layer may be applied by lightly spraying on the silicate solution, for example, a 2% potassium silicate solution, in 2 to 4 rapid passes. The silicate coating is then dried.

Referring to Fig. 3, the screen may then be provided with a layer of aluminum 8 in conventional manner. This may be accomplished as follows. Cover the rough surface of the screen with water to a depth of about one inch. Place a drop or two of a solution of nitrocellulose in an organic solvent which is immiscible with water on the surface of the water and thus permit the nitrocellulose to spread over the surface to form a film of substantially uniform thickness. Permit most of the organic solvent to evaporate, thus partially hardening the nitrocellulose film. Drain the water slowly from beneath the nitrocellulose film thus permitting the film to settle upon the phosphor. Evaporate the remaining organic solvent to further harden the nitrocellulose film. Deposit a film of aluminum by conventional evaporation technique over the nitrocellulose and then bake to remove the nitrocellulose leaving a film of aluminum stretched over the phosphor dots. When the aluminized tube is baked out, the same type of baking schedule is used as that previously described.

Obviously, the technique which has been described could be used with a screen comprising only the selenide phosphor since that is the one which is most unstable at ordinary bake-out temperatures. It is also obvious that the method can be applied to any phosphor which is unstable in the same way as the selenide phosphor.

Although air may be used as the bake-out atmosphere, oxygen can be used equally as well. Also, the screen paste compositions are not particularly critical. Other binders may be used which burn off at the temperatures specified and other proportions of phosphor to binder can also be employed.

What is claimed is:

1. In a method of manufacturing a luminescent screen comprising a phosphor which is relatively unstable at temperatures above about 350° to 400° C., the steps comprising baking a layer of said phosphor containing an organic binder which burns off when baked in air at a temperature below 400° C. under forced air circulation at a temperature above about 350° C. and below 400° C. for about 8 to 30 minutes during which a maximum temperature of about 375–400° C. is maintained for about 1 to 5 minutes.

2. A method according to claim 1 in which said phosphor comprises a selenide phosphor.

3. A method according to claim 2 in which said organic binder is ethyl cellulose.

4. A method according to claim 3 in which said baking temperature is maintained above about 350° C. and below 400° C. for about 8 to 12 minutes during which a maximum temperature of about 375° C. is maintained for about 1 minute.

5. In a method of manufacturing a luminescent screen comprising a phosphor which is relatively unstable at temperatures above about 350° to 400° C., the steps of baking a layer constituted of discrete elements of said phosphor containing an organic binder which burns off when baked in air at a temperature below 400° C. under forced air circulation at a temperature above about 350° C. and below 400° C. for about 8 to 30 minutes, during which a maximum temperature of about 375–400° C. is maintained for about 1 to 5 minutes, cooling said phosphor and covering said layer with a thin film of a substance selected from the class consisting of sodium silicate and potassium silicate such that said film surrounds each of said elements.

6. A method according to claim 5 in which said silicate is potassium silicate.

7. A method according to claim 6 in which said phosphor is selenide.

References Cited in the file of this patent

UNITED STATES PATENTS

| | | |
|---|---|---|
| 662,154 | Derby | Dec. 5, 1951 |
| 2,625,734 | Law | Jan. 20, 1953 |